United States Patent [19]

Kanamaru

[11] Patent Number: 4,864,428
[45] Date of Patent: Sep. 5, 1989

[54] DISK PLAYER HAVING VARIABLE SPINDLE SPEED FOR CONTINUOUS AUDIO IN FAST AND SLOW REPRODUCTION MODES

[75] Inventor: Hitoshi Kanamaru, Saitama, Japan

[73] Assignee: Pioneer Electronic Corporation, Tokyo, Japan

[21] Appl. No.: 160,808

[22] Filed: Feb. 26, 1988

[30] Foreign Application Priority Data

Feb. 26, 1987 [JP] Japan .................. 62-27653

[51] Int. Cl.4 .......................... H04N 5/76; G11B 7/00
[52] U.S. Cl. ................................. 358/342; 360/73.03;
   360/19.1; 360/10.1; 358/311; 358/321;
   358/323; 358/337; 358/338; 358/341
[58] Field of Search ............... 358/342, 311, 320, 321,
   358/312, 323, 337, 338, 341, 343; 360/10.1, 73,
   33.1, 35.1–36.1, 19.1, 73.03; 369/50, 5, 9, 43–47

[56] References Cited

U.S. PATENT DOCUMENTS 4,675,749  6/1987  Banno et al. .................. 358/342

Primary Examiner—Robert L. Richardson
Attorney, Agent, or Firm—Sughrue, Mion, Zinn, Macpeak & Seas

[57] ABSTRACT

A disk player in which the audio signal can be reproduced during FAST and SLOW playing modes. The speed of the spindle motor is controlled in accordance with the phase and frequency difference between a reference synchronizing signal and a synchronizing signal derived from information read from the disk. The frequency of the reference synchronizing signal is made variable to vary the speed of the spindle and hence the speed of reproduction of the disk.

6 Claims, 3 Drawing Sheets

DISK PLAYER HAVING VARIABLE SPINDLE SPEED FOR CONTINUOUS AUDIO IN FAST AND SLOW REPRODUCTION MODES

BACKGROUND OF THE INVENTION

The present invention relates to an information recording disk player, and more particularly to an information recording disk player having a video memory which is capable of storing video information for at least one field of a reproduced video signal.

A conventional apparatus of the same general type as the invention is shown in FIG. 1. In this figure, a video disk 1, which is an information recording disk, is rotatably driven by a spindle motor 2 while the information recorded on the disk is read by an optical pickup 3. The output from the pickup 3 is then amplified by a preamplifier 4, the audio component of the amplified output is demodulated by an audio demodulating circuit 5, and the resulting signal is supplied to an audio output terminal 6. The video component is demodulated by video demodulating circuit 7 and then supplied to a video output terminal 9 through a video memory (field memory or frame memory) 8. The demodulated output of video demodulating circuit 7 is also supplied to a synchronizing signal separating circuit 10 and a write clock and address generating circuit 11.

The synchronizing signal separating circuit 10 separates and extracts the horizontal synchronizing signal included in the video signal and applies it to a spindle servo circuit 12 for comparison with a reference signal produced by a reference signal generating circuit 13. The reference signal has a fixed frequency which is a multiple of a frequency determined by the applicable television system, (NTSC, etc.) standards. The spindle servo circuit 12 detects the frequency and phase difference between the recovered horizontal synchronizing signal and the reference signal and generates a servo control signal which depends on the detected frequency and phase difference. The servo control signal is used to control the driving of the spindle motor 2 through a drive circuit 14 to thus control the rotational speed of the video disk 1.

The write clock and address generating circuit 11 generates the write clock and address signal, which is used to control the write timing of video information to the video memory 8 depending on the horizontal synchronizing signal or color burst signal contained in the video signal.

The readout of video information from the video memory 8 is carried out in response to a readout clock and address signal produced by a readout clock and address generating circuit 13 on the basis of the reference signal from the reference signal generating circuit 13. Writing to the video memory 8 is enabled only when a write enable signal is supplied from an external control circuit (not illustrated) through an input terminal 16.

In such a player, the video memory 8 is capable of storing at least one field of video information. With this arrangement, jitter (time axis) variation in the reproduced video signal can be absorbed and special playing modes, such as STILL, SEARCH, SLOW, FAST, etc., can be realized in playing a CLV (Constant Linear Velocity) on which the synchronizing signal is not recorded in positions falling along a radial line on the disk. For such reproduction, writing operations from the video memory 8 are carried out with a write clock synchronized with the reproduced synchronizing signal and reading operations performed with a readout clock synchronized with the fixed-frequency reference signal.

In the conventional apparatus, these special playing modes are further realized by so-called jump operations in which the information readout point is changed by causing the pickup to jump recording tracks. Particularly, the SLOW and FAST mode playing operations are respectively realized by appropriately selecting jump points for repeated replaying of designated fields and jump points without replaying. However, it has heretofore been impossible to reproduce the accompanying audio information in the SLOW and FAST play modes.

SUMMARY OF THE INVENTION

Accordingly, it is an object of the present invention to provide a disk player which is capable of reproducing not only the video information but also the accompanying audio information in the SLOW and FAST reproduction modes.

In accordance with the above and other objects, the invention provides a disk player having a video memory which stores an amount of video information equal to at least one video signal field, and in which the frequency of the readout clock for the video memory is fixed while the frequency of the reference synchronizing signal used for controlling the spindle servo is varied, wherein the rotation speed of the disk for the various playing operations is varied by changing the frequency of the reference synchronizing signal.

DESCRIPTION OF THE PREFERRED EMBODIMENTS

Preferred embodiments of the present invention will now be described in detail with reference to the accompanying drawings.

Figure 2:
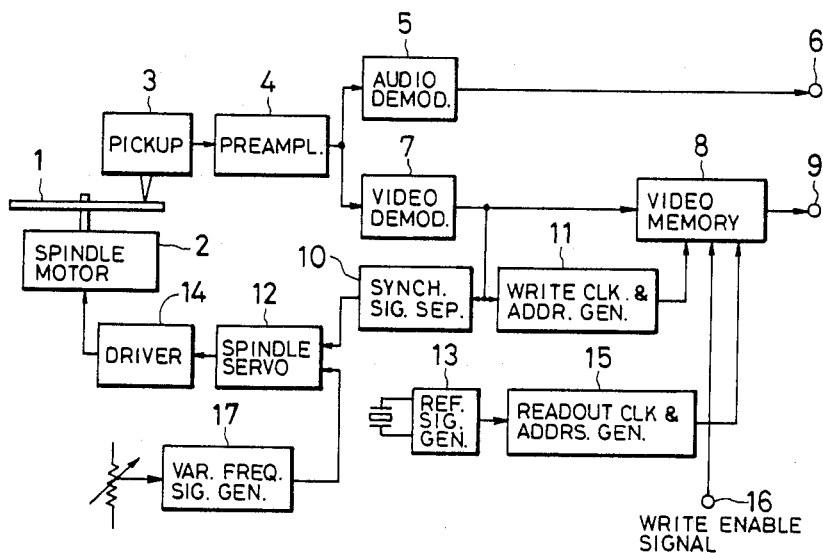
FIG. 2 is a block diagram of a preferred embodiment of a disk player of the present invention.

FIG. 2 is a block diagram of a preferred embodiment of a disk player of the present invention. In this disk player, a variable frequency signal generating circuit 17, which produces a reference signal of variable frequency, is provided in addition to the reference signal generating circuit 13, which generates the reference signal of fixed frequency. The reference signal of variable frequency is used as the reference signal for the spindle servo circuit 12 which controls the rotational speed of the video disk 1.

Figure 1:
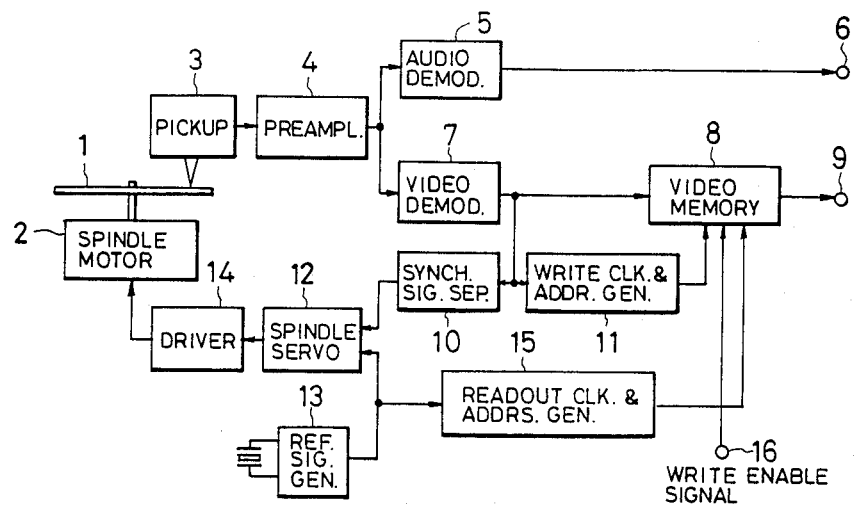
FIG. 1 is a block diagram of a conventional disk player.

Other portions of the player are the same as those of conventional player of FIG. 1.

As explained previously, the rotational speed for the playing operation of the video disk 1, namely, the playing speed of the video player, can be adjusted by varying the frequency of the reference synchronizing signal of the spindle servo.

In this arrangement, the video information is stored in the video memory (field memory or frame memory) 8 in proper sequence based on the write clock and address signal generated by the write clock and address generating circuit 11 in accordance with the reproduced video signal.

The video memory 8 is a digital video memory system inclusive of an input A/D converter, a RAM and an output D/A converter, for instance. However, if desired, the video memory 8 can be implemented with a CCD, etc. Moreover, the video memory 8 can be used to store the video information in such a manner that the synchronizing signal is directly stored together with the image information or only the image information is stored and the synchronizing signal is added during the readout operation to realize a reduction of the required memory capacity.

Since the frequency of the readout clock for the video memory 8 generated by the reference signal generating circuit 13 is determined on the basis of the reference signal, a video signal which conforms to the television broadcast standards appears at the video output terminal 9.

Although not illustrated in this figure, a video processing circuit may be employed in a successive stage to video memory 8 and correction carried out so that the even and odd fields are properly interleaved and the color subcarrier phase made continuous.

Regarding the audio signal, since the demodulation output of the audio demodulation circuit 5 is directly supplied to the audio output terminal 6, the pitch of the audio signal changes in proportion to the rate of rotation of the disk. The audio can still be comprehended though because the signal is continuous. Because reproduction of the audio signal is enabled, it is possible, for instance, for the user to locate the start of a desired musical passage in the FAST mode. If desired, the pitch of a musical signal can be changed in accordance with the speed by performing a filtering operation. It may also be required in some cases to change the center frequency of the demodulation circuit 5 and the filter or clock frequency in accordance with the rate of rotation of the disk so that accurate demodulation can be realized.

Figure 3:
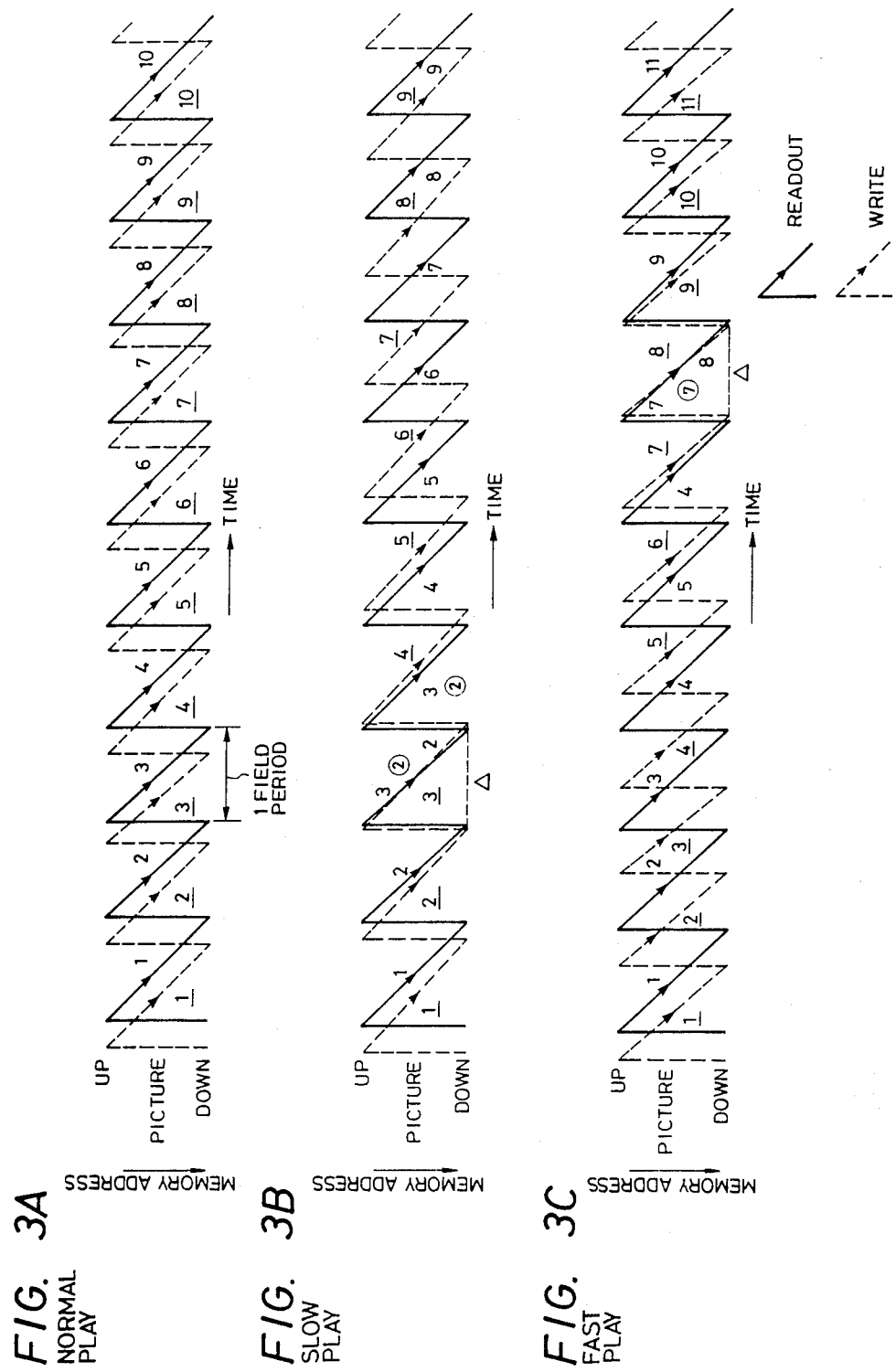
FIG. 3A to 3B show writing and reading timing charts for the video memory in FIG. 2.

FIGS. 3A, 3B and 3C are write and read operation timing charts of the video signal for the video memory 8. Specifically, FIG. 3A shows the timing for an ordinary play operation, FIG. 3B, the timing for a SLOW play operation, and FIG. 3C, the timing for a FAST play operation. The video memory 8 should be constructed such that the clock frequencies for reading and writing operations can be freely set.

In FIGS. 3B and 3C, the reproduced pictures are sometimes different in the upper and lower halves in the indicated timing diagrams because the readout address outruns the write address and the new and old field pictures are changes. However, this causes no problem in practice since the picture contents of preceding and successive fields are generally very similar.

Figure 4:
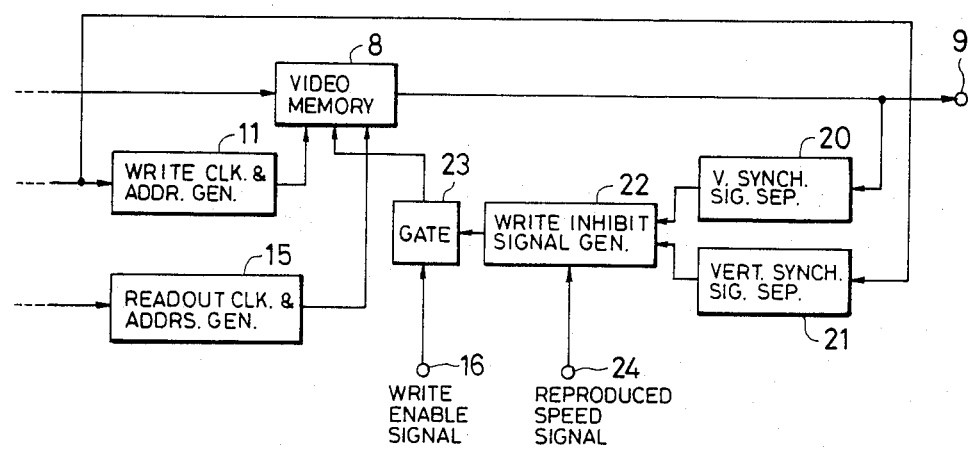
FIG. 4 is a block diagram showing a modified version of the player of FIG. 2.

To avoid such a condition, as indicated in FIG. 4, the vertical synchronizing signal in the video signal to be written to the video memory 8 and the vertical synchronizing signal in the video signal read from the video memory 8 are separated by the vertical synchronizing signal separating circuits 20 and 21, the time difference between the two vertical synchronizing signals is detected by a write inhibit signal generating circuit 22, and the write enable signal to the video memory 8 is inhibited by a gate circuit 23 when such time difference is within a predetermined range to thus inhibit the writing of a new field to the video memory 8. The time difference and forward/backward relation of course differ in accordance with the speed of the playing operation. Therefore, it is sufficient that the reference time difference in the write inhibit signal generating circuit 22 be set in accordance with a play operation speed signal supplied through the input terminal 24.

Figure 5:
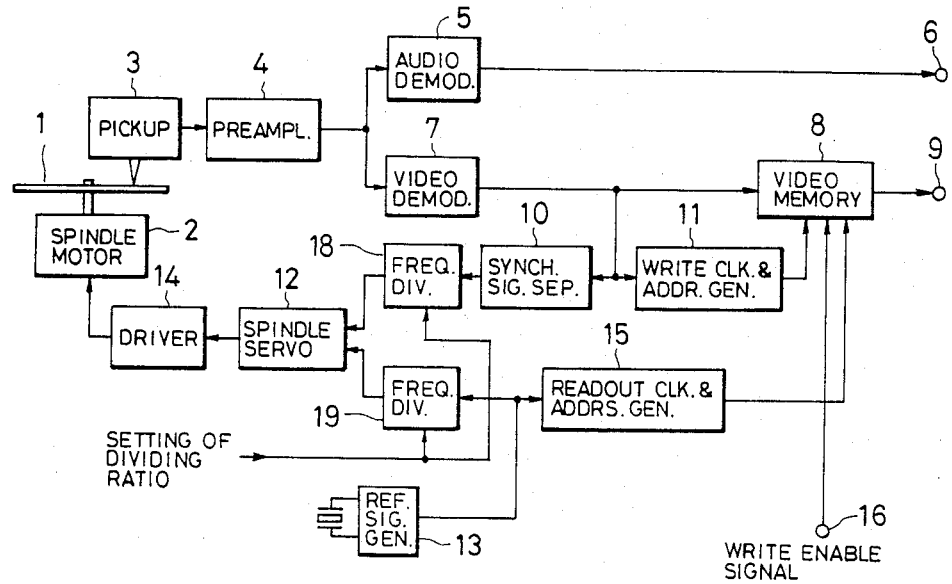
FIG. 5 is a block diagram of another preferred embodiment of the present invention.

FIG. 5 is a block diagram of another embodiment of the present invention. In this embodiment, the reproduced horizontal synchronizing signal separated and extracted by the synchronizing signal separating circuit 10 is frequency-divided by the a/m frequency divider circuit 18 in order to form a comparison input to the spindle servo circuit 12, the reference signal of fixed frequency from the reference signal generating circuit 13 is frequency-divided by the 1/n frequency divider circuit 19 in order to form a reference input to the spindle servo circuit 12, and the rotational speed of the disk 1 is varied by freely setting the ratio m/n of the two frequency-dividing circuits 18 and 19 in accordance with a control signal from the external control circuit (not illustrated).

According to this embodiment, the rate of rotation of the disk and the readout clock frequency for the video memory 8 are set in accordance with the selected frequency division ratio.

In each embodiment described above, a closed loop circuit is used to control the rate of rotation of the disk 1 by the spindle servo system by comparing the frequency and phase of the reference synchronizing signal and the reproduced synchronizing signal. However, an output signal from a frequency power generator (not illustrated) which operates in conjunction with the spindle motor 2 may be used in place of the reproduced synchronizing signal, and in some case in open-loop circuit may be used to control the rotational speed of the disk.

An explained above, in the information recording disk player of the present invention the rotational speed of the disk is set by fixing the frequency of the readout clock for the video memory, varying the frequency of the reference synchronizing signal for the spindle servo, and varying the frequency of the reference synchronizing signal to thereby reproduce not only the video information but also the audio information as a continuous signal, even in the case of reproduction at such speeds as used in the SLOW and FAST reproduction modes.

What is claimed is:

1. In a disk player for playing a disk containing audio and video information comprising a video memory capable of storing video information for at least one field of a reproduced video signal, means for providing a reference synchronizing signal, means for providing a synchronizing signal derived from information read from an information recording disk, means for detecting at least one of the frequency and phase difference between said reference synchronizing signal and said synchronizing signal derived from information read from an information recording disk, a motor for rotating said information recording disk, means for controlling the rotational speed of said motor depending on at least one of the frequency and phase difference detected by said detecting means, and means for supplying readout clock signals to readout data stored in said video memory: the improvement wherein said means for supplying readout clock signals supplies clock signals at a fixed frequency, and said means for providing a reference synchronizing signal includes means for varying the frequency of the reference synchronizing signal and said means for controlling the rotational speed of said motor.

2. The disk player of claim 1, wherein said means for providing said reference synchronizing signal comprises a variable frequency source.

3. The disk player of claim 1, wherein said means for providing said reference synchronizing signal comprises a fixed-frequency signal source and a first frequency divider coupled to an output of said fixed-frequency signal source.

4. The disk player of claim 3, further comprising a second frequency divider disposed in a path of said synchronizing signal derived from information read from said information recording disk prior to said detecting means.

5. The disk player of claim 1, further comprising:

means for separating a first vertical synchronizing signal from said video signal to be written to said video memory;

means for separating a second vertical synchronizing signal from said video signal read from said video memory;

means for detecting the time difference between said first and second vertical synchronizing signals, said time difference detecting means generatng an output signal when said time difference is within a predetermined range; and means for inhibiting the writing of new video information to said video memory in accordance with said output signal of said time difference detecting means.

6. The disk player of claim 5, wherein said predetermined range for said time difference is set in accordance with a play operation speed signal.

* * * * *